Patented Oct. 7, 1930

1,777,634

UNITED STATES PATENT OFFICE

CLAYTON W. BEDFORD, OF AKRON, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Original application filed September 14, 1928, Serial No. 306,100. Divided and this application filed January 13, 1930. Serial No. 420,633.

This invention relates to the art of preserving rubber, either in a vulcanized or unvulcanized condition and to rubber compositions so preserved.

It is well known that the condensation products of aldehydes with aromatic amines, such as acetaldehyde-aniline and aldol-alpha-naphthylamine, when incorporated into rubber, possess the property of retarding the deterioration which it normally undergoes when exposed to light, heat, or air. The object of this invention is to provide a new class of such condensation products which are particularly effective age-resisters, that is, are effective in retarding the deterioration of rubber.

This invention, in brief, consists in treating rubber with the non-accelerating condensation product of an unsaturated aldehyde with an amine. Such condensation products may be prepared by mixing the aldehyde and the amine in any convenient proportions, but preferably in the proportions of from one to three molecular equivalents of aldehyde to one molecular equivalent of amine, with the addition of a small amount of acid as a catalyst. The mixture is heated to drive off the water formed during the reaction. If desired the reaction may be carried out in a different manner, such as in an aqueous solution, in which case it will be found advantageous to add a considerable amount of acid. The products are in general oils or soft resins which are very readily incorporated into rubber or rubber compositions, and which also possess the useful property of softening unvulcanized rubber and rendering it readily and smoothly workable on the calender or in the tubing machine.

Age-resisting, non-accelerating condensation products may thus be prepared from any unsaturated straight or branched chain aliphatic aldehyde, such as crotonaldehyde, alpha-ethyl-beta-propyl acrolein and other substituted acroleins, as well as vinylacetaldehyde, etc., when reacted with an amine, but preferably with an aromatic amine, such as aniline, toluidine, alpha or beta naphthylamine, p-amino-diphenylamine, p-phenylenediamine, diamino diphenylmethane, p-amino-dimethyl-aniline, etc. However, it has been found that the condensation products of aldehydes and amines of high molecular weight give the best aging results. Thus crotonaldehyde and alpha-ethyl-beta-propyl acrolein give considerably better condensation products than the unsubstituted acrolein. But the difference is most noticeable in the case of the amines. Condensation products prepared from p-toluidine or p-amino-diphenylmethane are better age-resisters than those prepared from aniline, but those prepared from alpha-naphthylamine are very markedly better. Of course, if the molecular weight becomes too high, the quality of the product may suffer by reason of its diminished solubility in rubber. It is essential that the preparation be so directed that the product is substantially non-accelerating, since the purpose of this invention is to provide a class of substantially non-accelerating age-resisters which may be incorporated into existing rubber compositions without appreciably affecting the rate of cure. This desired result can in general be attained by carrying out the reaction of the unsaturated aldehyde with the amine in an acid medium or by reacting the aldehyde with an amine of high molecular weight. If a small amount of strong acid is added to the mixture of the aldehyde and the amine to catalyze the reaction, it is not usually necessary to remove the acid by neutralization or washing after the reaction is complete, since it remains in the product in a combined form. Any member of the above-mentioned class of condensation products of unsaturated aldehydes with amines may be incorporated into rubber, preferably from 0.25 to 5 parts by weight to 100 parts of rubber being used. Such treatment imparts excellent age-resisting properties to the rubber, enabling it to withstand aging without sensible deterioration for a far longer period than similar untreated rubber.

The acids which are employed as catalysts are preferably the ordinary strong non-oxidizing mineral acids such as hydrochloric or sulphuric acids or the moderately strong fatty acids such as acetic acid. Sufficient acid is often naturally present in the aldehyde as a result of its oxidation to the corresponding fatty acid. Strong oxidizing acids such as nitric acid are to be avoided.

*Example 1.*—As a specific example of one embodiment of the method of this invention, a condensation product was prepared by heating together 143 parts by weight of alpha-naphthylamine (1 molecular equivalent) and 252 parts of alpha-ethyl-beta-propyl-acrolein (2 molecular equivalents) in the presence of sulfur dioxide gas, which acts as an acid catalyst. The temperature was gradually raised to 300° F. and the product, which was a viscous deep red liquid, was then allowed to cool. A typical tire tread composition was prepared containing blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. One portion of this was used as a control. To another portion was added as age-resister 0.95 parts (0.5% of the composition) of the condensation product prepared as described above. The two compositions were thoroughly mixed, and cured in a press for 45 min. at 294° F. to produce an optimum cure. The vulcanized compositions were tested to compare their relative rates of aging, by measuring their tensile strength and elongation at the breaking point before and after aging. The accelerated aging was carried out in the Geer aging oven, in which the samples were maintained at a temperature of 158° F. in a constantly renewed stream of air. The results are shown in the table below:

*Tensile strength in pounds per square inch and elongation at the breaking point*

| Exposure | Without age-resister | | With age-resister | |
|---|---|---|---|---|
| | Tensile strength | Elongation | Tensile strength | Elongation |
| Before aging | 4,025 | Per cent 655 | 3,955 | Per cent 658 |
| After 7 days in the Geer oven | 1,918 | 430 | 2,863 | 532 |

*Example 2.*—As another specific example of the process of this invention, a product was made by heating a mixture of 143 parts by weight of alpha-naphthylamine (1 molecular equivalent) and 71 parts of strongly acidic crotonaldehyde (1 molecular equivalent) for two hours at 230° F. The resinous condensation product was incorporated into a rubber composition and tested as in Example 1 above. The results are shown below:

*Tensile strength in pounds per square inch and elongation at the breaking point*

| Exposure | Without age-resister | | With age-resister | |
|---|---|---|---|---|
| | Tensile strength | Elongation | Tensile strength | Elongation |
| Before aging | 3,943 | Per cent 663 | 4,022 | Per cent 683 |
| After 7 days in the Geer oven | 1,398 | 313 | 3,049 | 542 |

This product may also be prepared in solution in which case the procedure may be as follows: 45 parts of sulfuric acid was dissolved in 700 parts of water and the crotonaldehyde was stirred in. The alpha-naphthylamine was separately emulsified by melting it and stirring it into 300 parts of hot water. This emulsion was then added with vigorous agitation to the acid solution containing the crotonaldehyde. A fine precipitate formed as the materials reacted. The agitation was continued for 5 hours, after which the solution was neutralized, filtered, and the precipitate washed, and dried at room temperature. The product was a very fine light-colored powder, which darkened somewhat on exposure to sunlight, and which melted at about 135° C. to a resin. The powdered condensation product was incorporated into a rubber composition and tested in the same manner as the resin prepared by the direct reaction, with the following results:

*Tensile strength in pounds per square inch and elongation at the breaking point*

| Exposure | Without age-resister | | With age-resister | |
|---|---|---|---|---|
| | Tensile strength | Elongation | Tensile strength | Elongation |
| Before aging | 3,554 | Per cent 647 | 3,571 | Per cent 650 |
| After 7 days in the Geer oven | 1,793 | 480 | 2,444 | 552 |

From the examples given above it is evident that the condensation products of unsaturated aldehydes and aromatic amines are extremely effective in retarding the deterioration which rubber normally undergoes upon aging. Of course the proportions used in the preparation of the age-resisters may be varied (especially in the direction of higher proportions of aldehyde, such as 2 parts of aldehyde to 1 of amine), without departing from the scope of this invention. And rubber compositions differing greatly from that mentioned may be employed in the practice of this invention, with equally beneficial results, since the example is merely illustrative of one application. These condensation products may also be applied to unvulcanized or vulcanized rubber with good effect on the age-resisting properties of the rubber, such as by applying them to the surface of the rubber, as for example in solution, or in the form of a paste or emulsion.

It is well known that nitrogenous materials having a basic reaction, such as amines, amides, hydrazines, etc., although not themselves endowed with marked accelerating properties, possess the property of activating or of intensifying the accelerating action of certain commercial accelerators, especially sulfur-containing accelerators. Therefore, I do not intend to limit myself in my definition of non-accelerating products to those which have no effect upon the rate of vulcanization of rubber compositions containing accelerators activated by nitrogenous bases, but only to those which have substantially no effect upon the vulcanization of compositions not containing such accelerators. For example, if crotonaldehyde-alpha-naphthylamine is incorporated into a non-accelerated, sulfur-containing rubber composition, a useful vulcanized rubber product is not obtained, even after vulcanizing for an hour at 300° F. This age-resister is therefore considered a non-accelerator of vulcanization, in spite of the fact that it markedly increases the rate of vulcanization of a composition containing a sulfur-accelerator such as tetramethyl-thiuramdisulfide.

It is to be understood that the term "treating" as employed in the appended claims is used in a generic sense to include either the incorporation of the condensation products of unsaturated aldehydes and aromatic amines into the rubber by milling or similar process, or to the application thereof to the surface of a mass of crude or vulcanized rubber. The term "rubber" is likewise employed in the claims in a generic sense to include caoutchouc, balata, gutta percha, rubber isomers and like products, whether or not admixed with fillers, pigments, vulcanizing or accelerating agents.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if dedesired without departing from the spirit and scope of the invention as defined in the appended claims.

This is a division of my co-pending application, Serial No. 306,100, filed September 14, 1928.

I claim:
1. A method of preserving the quality of a vulcanized rubber composition that comprises incorporating therein a material formed by the interaction of a croton aldehyde and an amine in the presence of an acidic body.

2. A method of preserving the quality of a vulcanized rubber composition that comprises incorporating therein a material which is substantially a non-accelerator formed by the interaction of a croton aldehyde and an amine in the presence of an acid.

3. A method of preserving the quality of a vulcanized rubber composition that comprises incorporating therein a material formed by the interaction of croton aldehyde and aniline in the presence of an acid.

4. A vulcanized rubber composition embodying a preservative formed by the interaction of a croton aldehyde and an amine in the presence of an acid.

5. A vulcanized rubber composition embodying a preservative formed by the interaction of a croton aldehyde and aniline in the presence of an acid.

In witness whereof I have hereunto set my hand this 9th day of January, 1930.

CLAYTON W. BEDFORD.